United States Patent
Winterot et al.

(10) Patent No.: US 9,652,847 B2
(45) Date of Patent: May 16, 2017

(54) METHOD FOR CALIBRATING A DIGITAL OPTICAL IMAGING SYSTEM HAVING A ZOOM SYSTEM, METHOD FOR CORRECTING ABERRATIONS IN A DIGITAL OPTICAL IMAGING SYSTEM HAVING A ZOOM SYSTEM, AND DIGITAL OPTICAL IMAGING SYSTEM

(71) Applicant: Carl Zeiss Microscopy GmbH, Jena (DE)

(72) Inventors: Johannes Winterot, Jena (DE); Thomas Milde, Jena (DE); Max Funck, Weimar (DE); Toufic Jabbour, Aalen (DE)

(73) Assignee: Carl Zeiss Microscopy GMBH, Jena (DE)

( * ) Notice: Subject to any disclaimer, the term of this patent is extended or adjusted under 35 U.S.C. 154(b) by 323 days.

(21) Appl. No.: 14/449,822

(22) Filed: Aug. 1, 2014

(65) Prior Publication Data
US 2015/0035965 A1  Feb. 5, 2015

(30) Foreign Application Priority Data
Aug. 3, 2013  (DE) .......... 10 2013 012 988

(51) Int. Cl.
*H04N 7/12* (2006.01)
*H04N 11/02* (2006.01)
(Continued)

(52) U.S. Cl.
CPC .......... *G06T 7/0018* (2013.01); *G02B 21/365* (2013.01); *G06T 5/006* (2013.01);
(Continued)

(58) Field of Classification Search
None
See application file for complete search history.

(56) References Cited

U.S. PATENT DOCUMENTS
2001/0028391 A1  10/2001  Iko
2002/0041383 A1  4/2002  Lewis, Jr. et al.
(Continued)

FOREIGN PATENT DOCUMENTS
DE  101 14 757 B4  10/2001
DE  102 25 193 A1  1/2004
(Continued)

*Primary Examiner* — Talha M Nawaz
(74) *Attorney, Agent, or Firm* — Nixon Peabody LLP; Jeffrey L. Costellia

(57) ABSTRACT

The invention relates to a method for calibrating a digital optical imaging system, comprising at least one motorized or coded zoom system and an image sensor, to a method for correcting aberrations in such an imaging system, and to an optical imaging system which is configured to carry out the methods according to the invention. During the calibration method, a reference object is recorded in various zoom settings and the image is corrected pixel-wise with digital-optical means using a previously determined model. To this end, distortion correction coefficients and image stability correction coefficients are ascertained. The real total magnification of the system is ascertained from the corrected image. The model ascertained in the calibration process also serves for correcting aberrations during operation of the imaging system.

12 Claims, 1 Drawing Sheet

Figure 1:
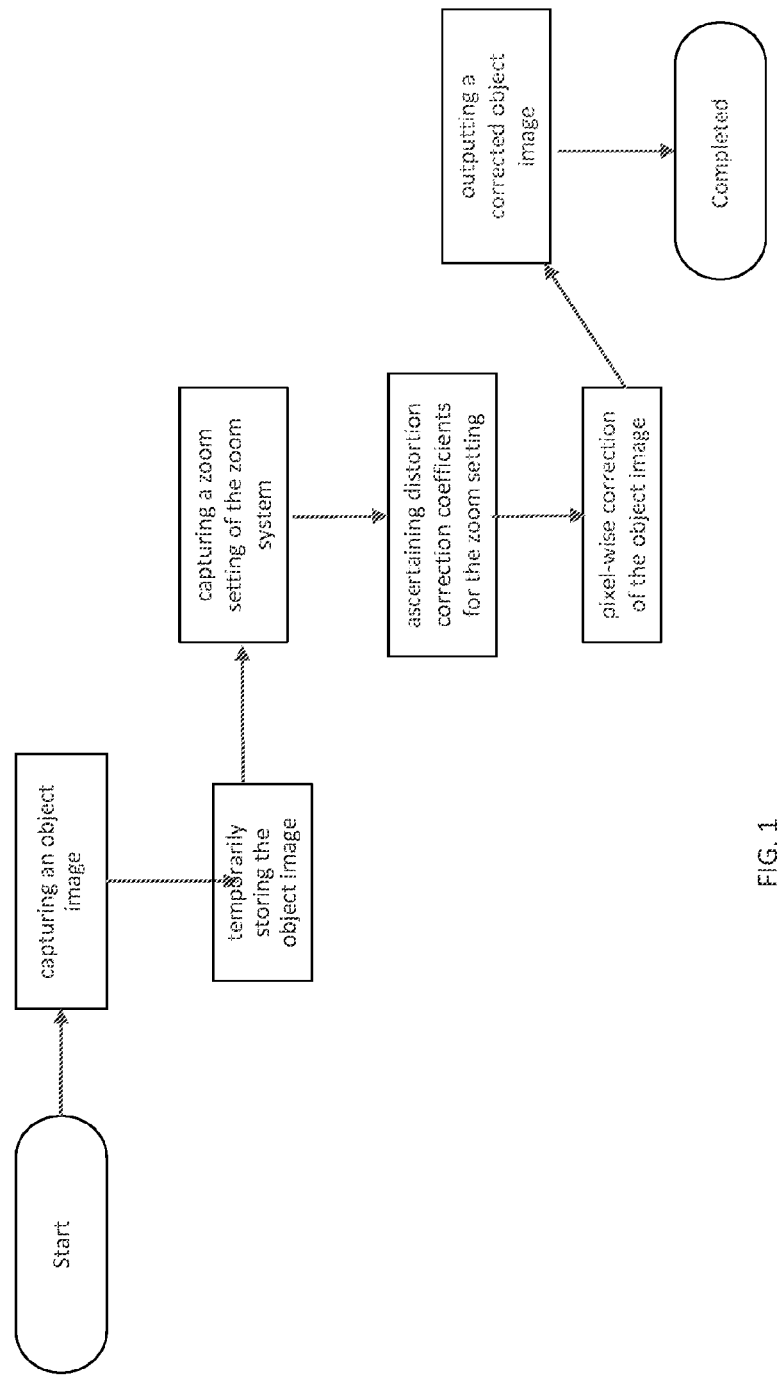

(51) Int. Cl.
*H04N 11/04* (2006.01)
*G06T 7/00* (2017.01)
*H04N 5/232* (2006.01)
*H04N 17/00* (2006.01)
*G02B 21/36* (2006.01)
*G06T 5/00* (2006.01)
*G06T 7/80* (2017.01)

(52) U.S. Cl.
CPC ............ *G06T 7/80* (2017.01); *H04N 5/23229* (2013.01); *H04N 5/23296* (2013.01); *H04N 17/002* (2013.01); *G06T 2207/10056* (2013.01); *G06T 2207/10148* (2013.01)

(56) References Cited

U.S. PATENT DOCUMENTS

| | | |
|---|---|---|
| 2002/0176160 A1 | 11/2002 | Suzuki et al. |
| 2004/0004762 A1 | 1/2004 | Bruehl et al. |
| 2005/0053307 A1* | 3/2005 | Nose .................... G06T 3/0018 382/275 |
| 2005/0213159 A1* | 9/2005 | Okada .................... H04N 1/387 358/3.26 |
| 2008/0239107 A1 | 10/2008 | Cho |
| 2009/0154822 A1 | 6/2009 | Cabral et al. |
| 2009/0268078 A1 | 10/2009 | Miyazaki et al. |
| 2010/0246994 A1* | 9/2010 | Sawada ................ H04N 5/3572 382/275 |
| 2012/0044387 A1* | 2/2012 | Usami .................. H04N 5/3572 348/240.3 |
| 2013/0011020 A1* | 1/2013 | Kamoshida ........ H04N 5/23267 382/107 |
| 2013/0038699 A1* | 2/2013 | Hayashi ................ G03B 35/10 348/47 |

FOREIGN PATENT DOCUMENTS

| | | |
|---|---|---|
| DE | 10 2008 059 372 A1 | 9/2009 |
| DE | 10 2010 025 888 A1 | 1/2012 |

* cited by examiner

METHOD FOR CALIBRATING A DIGITAL OPTICAL IMAGING SYSTEM HAVING A ZOOM SYSTEM, METHOD FOR CORRECTING ABERRATIONS IN A DIGITAL OPTICAL IMAGING SYSTEM HAVING A ZOOM SYSTEM, AND DIGITAL OPTICAL IMAGING SYSTEM

TECHNICAL FIELD

The invention relates to a method for calibrating a digital optical imaging system, a method for correcting aberrations which occur with various optical units, in particular for digital optical imaging systems having a zoom system. In addition, the invention relates to a digital optical imaging system, in which such methods are implemented.

SUMMARY OF THE INVENTION

The digital optical imaging system is preferably a digital microscope having a zoom system and an objective which may be interchangeable. However, the imaging system may also be a telecentric or other zoom system without an objective, as is used for example for various metrology tasks.

The description proceeds below from a digital microscope, which, however, does not signify any limitation to this application.

Aberrations occur if the various light rays emerging from the object point are not all focused in one image point. The most important aberrations are spherical and chromatic aberrations. Spherical and chromatic aberrations are corrected by systems consisting of a plurality of lenses of different glass types, and spherical aberrations are corrected by aspherical lenses or gradient lenses. A glass plate (plane plate) produces an image plane shift or a lack of sharpness, which increases as the aperture angle increases.

Imaging using lenses is always subject to errors to a greater or lesser extent. With increasing lens number, the correction is improvable. Costs for the optical unit and mounts increase. For example, color fringes or what is known as image field curvature occur in the microscopic image. By way of skillfully constructing the objectives, such aberrations can be ruled out to a large extent. Plane achromats, apochromats are examples thereof. In apochromatic objectives, color fringes are suppressed in the microscopic image by way of a complicated arrangement of different lenses in the objective. Plane achromats are corrected such that the image field curvature which normally occurs in the microscopic image is eliminated.

Out of all objectives, plane apochromats have the most complicated construction. In these objectives, the image field curvature, as in the plane achromats, is largely eliminated. In addition, the usually occurring red and blue color fringes are prevented in these objectives by the very complicated construction. Said objectives are very expensive and primarily used in color micro-photography with the highest of requirements.

In zoom systems, aberrations due to centering differences in the zoom construction also occur (image instability).

DE 102 25 193 A1 discloses a method for calibrating the magnification of a stereo microscope, in which calibration over the entire magnification range is intended to be derivable on the basis of an initial calibration. Using an objective/eyepiece reference measurement pair, actual magnifications prespecified on the microscope are set by actuating the zoom. The position of the individual lenses of the zoom present in this case are captured and a nominal magnification value is stored for each zoom setting. By computationally comparing the actual magnification to the nominal magnification, a correction factor is calculated which is used to calibrate the entire zoom range.

In digital photography, objective distortions can be corrected manually for example by way of software, wherein extensive databases for cameras and objectives must be available. Objective corrections (distortions, chromatic aberrations and vignetting) are in part carried out internally using using the firmware of the cameras (for example Sony).

DE 101 14 757 B4 describes a microscope system having a zoom optical unit and a digital camera. The digitally photographed image is corrected in a correction unit (PC) in accordance with image correction data according to the respective magnification. The image correction data are here photographic image data of a standard background image. For each image element, an exclusive-OR function according to the object image and the standard background image is carried out.

DE 10 2010 025 888 A1 discloses a digital camera having an implemented method for producing a distortion-free digital image, which allows optimum image distortion correction which is matched to the camera objective that is present in each case. In the method, correction values for each type of camera objective are experimentally determined once and subsequently stored in all digital cameras of the same objective type. The distortion function is here dependent on the set focal length and the distance from an object to be recorded and can be ascertained as a two-dimensional matrix from constants and stored in the digital camera. Here the factors can be ascertained by interpolation from the stored matrix.

US 2008/0239107 A1 and US 2009/0268078 A1 discloses distortion correction methods for digital cameras, in which coefficients are stored in a table in dependence on zoom and focus settings. Intermediate values are ascertained in the correction through interpolation with higher-order polynomials.

In digital microscopy, usually objective and zoom system are configurable among one another. That is to say, a zoom system can be used with different objectives. Since both the zoom system and the objective cause different aberrations, different corrections are necessary in order to achieve satisfactory image quality.

The invention is based on the object of specifying a method for calibrating a digital optical imaging system which allows aberrations to be corrected during operation. A further object is the specification of a method for correcting aberrations in a digital optical imaging system and the production of such a digital optical imaging system, which comprises a motorized or coded zoom system and possibly an objective, wherein image correction is intended to take place at all zoom settings with great accuracy and reliability.

The object is achieved according to the invention by way of methods having the features of independent method claims 1 and 6 and by a digital optical imaging system having the features of claim 11.

Advantageous configuration embodiments are specified in the dependent claims.

A digital optical imaging system comprises at least one zoom system, an image sensor and a logic unit for digital image processing. The imaging system can be, for example, a telecentric or other zoom system without an objective, or else a digital microscope.

The digital microscope comprises at least one objective, a motorized zoom system, the image sensor and the logic unit for image processing. The logic unit is preferably arranged together with the zoom system in what is known as an optical engine, which also accommodates a motor controller for the zoom system and further control and evaluation components. The objective is preferably arranged interchangeably on the optical engine. The objective advantageously has a dedicated data memory and an electronic interface via which said data memory can be read.

The digital microscope of course also comprises in a manner known per se a control unit for actuating the microscope components and an input/output unit for operation, image viewing and evaluation. The fact that a monitor, keyboard and operating components as input/output units in a digital microscope can also be present as separate components is obvious.

Digital microscopes also preferably have an object stage which is displaceable using a motor, a swivelling stand, an illumination apparatus for reflected illumination and possibly for transmitted illumination, and further components which are not mentioned here.

However, said components are not directly related to the invention, and therefore a detailed description has been omitted at this point.

The correction method is based on the assignment of magnification and correction data to the drive control of the zoom, possibly in connection with the associated objective.

The size of an object to be imaged is intended to proportionally change when the zoom is actuated around the image center. In preferably the largest and smallest magnifications, a reference object is imaged. From the change in the image coordinates, that image point which has this "center point property" is determinable. The images or recordings are then always aligned with that point and the image field is evaluated symmetrically therewith.

In order to use a correction method according to the invention in a digital microscope or another imaging system, first an initial calibration process is required for each digital microscope or imaging system produced, in which initial calibration process the actual optical data of the zoom system and possibly of the objective used and the resulting aberrations are ascertained.

For said initial calibration process, a reference object is placed on the object stage such that it can be captured in a known manner by an objective. The reference object has a reference pattern with fixedly defined reference points. The reference points are preferably equidistant, that is to say located in a manner such that they are distributed over the reference object at defined equal distances. The reference points preferably form an array of rows and columns.

DETAILED DESCRIPTION

A particularly preferred embodiment of the reference object is a chrome-coated glass plate, in which holes are provided at the reference points. Said glass plate is then illuminated from the side that is remote from the objective, that is to say viewed using the transmitted illumination method.

In the next step, any first zoom setting of the zoom system, of which the correct magnification factor (real zoom value $\beta$) is initially not known, is actuated. Preferably, the smallest or largest possible magnification is selected. In said first zoom setting, a reference image is recorded in the image sensor. To that end, the reference pattern of the reference object is imaged on the image sensor.

When using the particularly preferred reference object, the reference image is thus black, the reference points are then white points in the ideal case.

The reference image is initially decomposed into its three color components and in the process three color channel reference images $R_{red}$, $R_{green}$, $R_{blue}$ are produced and preferably stored in a temporary memory.

In the next step, the reference image is centered. This is done by fitting an ideal image corresponding to the reference pattern into the reference image. In the process, said ideal image is displaced and possibly rotated until the smallest deviation between the two images is achieved. Then the image center is ascertained. This centering takes place preferably using the green color channel reference image $R_{green}$, since green (or the green proportion in gray tones) makes the largest contribution to the brightness perception, and thus also to contrast and sharpness perception, in the human eye.

Finally, n position error vectors for the reference points are ascertained for each color channel reference image by determining the position deviations in height and width from the ideal image. The position error vectors are stored in a reference table.

Based on the knowledge of the real dimensions of the reference pattern, a real zoom value $\beta$ can be ascertained for each zoom setting in a simple manner and also be stored in the reference table.

Subsequently, the previously described steps for at least two further zoom settings are repeated. Preferably the position error vectors for seven or nine zoom settings are ascertained, including the smallest and largest zoom settings.

A distortion model is formed from the reference table by interpolating higher-order polynomials from the position error vectors in the various zoom settings and ascertaining eleven position error coefficients per color channel reference image. Additionally, image instability coefficients can be ascertained, and zoom motor positions for associated magnifications can be captured and stored.

The distortion model, that is to say the coefficients, magnifications and possibly further values are stored in a reduced zoom table. Said reduced zoom table preferably comprises four rows and contains coefficients of preferably third-degree regression polynomials, which permit the calculation of said values for any desired magnifications.

The reduced zoom table can be extended by using the following polynomials for any desired magnification $\beta$.

The magnitude of the coefficients of the distortion must be determined for each zoom position i. Associated with each zoom position i is a magnification $\beta$. The magnitude thereof should be determined from $\beta$ using the entries in the reduced zoom table.

Here, for the distortion correction coefficients a:

$$a_{m,n}(i(\beta)) = a_{m,n}(i^0=1) + a_{m,n}(i^0=2)*\beta + a_{m,n}(i^0=3)*\beta^2 + a_{m,n}(i^0=4)*\beta^3$$

applies; wherein m denotes the three color channels red, green, blue and n in each case assumes values from 1 to 11; and for image stability correction coefficients I:

$$I_m(i(\beta))=I_m(i^0=1)+I_m(i^0=2)*\beta+I_m(i^0=3)*\beta^2+I_m(i^0=4)*\beta^3$$

wherein m assumes coordinate values X and Y, and wherein $i^0 = 1 \ldots 3$, which are values in the reduced zoom table.

Ix and Iy describe the deviation of a center object with respect to the determined image center and serve for image stability correction.

The zoom table can be fixedly calculated and stored in the memory of the system, or can be calculated at the running time from the reduced zoom table and in that case preferably has the following form

| i | β | ... | $a_{R,1}$ | $a_{R,2}$ | ... | $a_{R,11}$ | $a_{G,1}$ | $a_{G,2}$ | ... | $a_{G,11}$ | $a_{B,1}$ | $a_{B,2}$ | ... | $a_{B,11}$ | $I_x$ | $I_y$ |
|---|---|---|---|---|---|---|---|---|---|---|---|---|---|---|---|---|
| 1 | | | | | | | | | | | | | | | | |
| 2 | | | | | | | | | | | | | | | | |
| 3 | | | | | | | | | | | | | | | | |
| ... | | | | | | | | | | | | | | | | |
| N | | | | | | | | | | | | | | | | |

The length of the zoom table depends on the coding of the drive to pass from the largest to the smallest achievable magnification. In zoom systems having mechanical focal adjustment, this may be the step number of the drive or of an encoder. In systems with direct drive, this is an entry in the motor control table.

The zoom table here, in one preferred embodiment, has N=4501 entries to pass from β=5 to β=0.5 with a step size of 0.001. High-quality image correction is thus possible for any conceivably possible zoom position.

In addition to the magnification β and the correction factors a, I, motor positions for each magnification value can, for example, also be stored in the zoom table.

The ascertainment of the distortion correction model is based on: "The Worst Distortions of Astrometric Instruments and Orthonormal Models for Rectangular Fields of View", Valeri V. Makarov, Daniel R. Veillette, Gregory S. Hennessy, & Benjamin F. Lane; United States Naval Observatory, 3450 Massachusetts Avenue NW, Washington D.C.

The zoom table compiled according to the invention can then be used during operation of the microscope to carry out distortion correction and possibly also image stability correction "on-the-fly" (during zooming) and to provide corrected images to the user without having to perform complicated software correction.

The method is integrated into the hardware of the optical engine by way of the logic unit and supplies high-quality images, both in live mode and in still-image mode. Owing to the hardware integration, the method is fast enough for the user not to notice any timeshift during live mode.

The typically used correction methods known to a person skilled in the art, such as denoising, shadow correction, white balancing, color correction, image stabilization and others can also be used in this context. However, this is not absolutely necessary and for this reason is not described in any more detail.

Zooming with a fixed image center is advantageously ensured owing to the image shift correction. If the zoom is not actuated, image stability correction is not necessary.

Owing to the extremely powerful distortion correction, it is possible under certain circumstances to use simpler lens assemblies in the digital microscope, which can be both cheaper and considerably faster.

Another advantage is that, independently of production tolerances, the exact magnification in each zoom stage is determinable. This is possible without special measures owing to the use of reduced zoom tables which are stored in the instrument, even during an objective change.

One possible embodiment of the correction method according to the invention is explained in more detail below.

The correction method according to the invention is applied to each image recorded by the image sensor. The correction here must be applied to features such as image stabilization and image rotation in a larger region than is shown to the user or stored as an image. The method is extremely fast if it is hardware-implemented.

The region referred to as User Display Region (UDR) in the preferred embodiment has 1600×1200 pixels. The correction range region or distortion correction region (DCR) comprises a region of 1760×1320 pixels. This region is therefore approximately 10% larger than the final image. The DCR is at a reference pixel (RP) close to the ascertained image center. The reference pixel is fixed during the entire method after determination of the image center.

For each pixel position (x, y) of the DCR, the corresponding "corrected" position $(x_d, y_d)$ is calculated as follows using the previously determined model stored in the memory of the logic unit.

$$x_{d,m} = a_{m,1} + a_{m,3} \cdot x_n + a_{m,5} \cdot y_n + a_{m,7} \cdot \left(x_n^2 - \frac{1}{3}\right) + a_{m,8} \cdot x_n y_n +$$
$$a_{m,9} \cdot \left(x_n r^2 - \frac{14}{15} x_n\right) + a_{m,10} \cdot \left(\frac{5}{9} x_n^2 + y_n^2 - \frac{14}{27}\right) + a_{m,11} \cdot \left(-\frac{4}{9} x_n y_n\right)$$

$$y_{d,m} = a_{m,2} + a_{m,4} \cdot y_n + a_{m,6} \cdot x_n + a_{m,7} \cdot x_n y_n + a_{m,8} \cdot \left(y_n^2 - \frac{1}{3}\right) +$$
$$a_{m,9} \cdot \left(y_n r^2 - \frac{14}{15} y_n\right) + a_{m,10} \cdot \left(-\frac{4}{9} x_n y_n\right) + a_{m,11} \cdot \left(x_n^2 + \frac{5}{9} y_n^2 - \frac{14}{27}\right)$$

wherein the index m for the three color channel reference images red, green, blue is used and r is the radius, wherein $r = \sqrt{(x_n^2 + y_n^2)}$.

The pixel coordinates here are normalized coordinates which are defined in the range from −1 to 1.

The image value at the calculated corrected position is calculated using a preferably linear interpolation model as a result of the initial pixel position (x, y). The adjacent pixels are taken into account in each case here.

This procedure is repeated for all three color channel reference images, the image is reassembled by superposing the color channels and cropped to the UDR and displayed and/or stored.

In case the corrected position $(x_d, y_d)$ is located outside the DCR, the pixel is set to NIL or "black."

The center coordinates of the cropped image are dependent on the static reference pixel, the image stability correction and any possibly activated image stabilization algorithm, which may have to be taken into account.

Although the specification discloses a number of logical stages in a particular order, stages which are not order dependent can be reordered and other stages can be combined or broken out. Alternative orderings and groupings, whether described above or not, can be appropriate or obvious to those of ordinary skill in the art of computer science. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles of the aspects and its practical applications, to thereby enable others skilled in the art to best utilize the aspects and various embodiments with various modifications as are suited to the particular use contemplated.

This application is based on and claims the benefit of priority from German Patent Application No. 10 2013 012 988.5, filed on Aug. 3, 2013, the contents of which are incorporated by reference.

We claim:

1. A method for correcting aberrations in a digital optical imaging system, comprising at least one zoom system and an image sensor, wherein a zoom table, which comprises correction coefficients for previously determined zoom stages, is stored in the imaging system, comprising the following steps:
   capturing an object image;
   temporarily storing the object image;
   capturing a zoom setting of the zoom system;
   ascertaining distortion correction coefficients for the zoom setting;
   pixel-wise correction of the object image using the distortion correction coefficients and the image stability correction coefficients; outputting a corrected object image; and
   ascertaining image stability correction coefficients for the zoom setting, wherein the pixel-wise correction of the object image also takes place using the image stability correction coefficients.

2. The method as claimed in claim 1, wherein a correction region of the object image is selected that is smaller than a sensor area of the image sensor.

3. The method as claimed in claim 1, wherein the pixel-wise correction takes place using the following relationship:

$$x_{dist,m} = a_{m,1} + a_{m,3} \cdot x + a_{m,5} \cdot y + a_{m,7} \cdot \left(x^2 - \frac{1}{3}\right) + a_{m,8} \cdot xy +$$
$$a_{m,9} \cdot \left(xr^2 - \frac{14}{15}x\right) + a_{m,10} \cdot \left(\frac{5}{9}x^2 + y^2 - \frac{14}{27}\right) + a_{m,11} \cdot \left(-\frac{4}{9}xy\right)$$

$$y_{dist,m} = a_{m,2} + a_{m,4} \cdot y + a_{m,6} \cdot x + a_{m,7} \cdot xy + a_{m,8} \cdot \left(y^2 - \frac{1}{3}\right) +$$
$$a_{m,9} \cdot \left(yr^2 - \frac{14}{15}y\right) + a_{m,10} \cdot \left(-\frac{4}{9}xy\right) + a_{m,11} \cdot \left(x^2 + \frac{5}{9}y^2 - \frac{14}{27}\right)$$

where m=[red, green, blue] and $r=\sqrt{(x_n^2+y_n^2)}$.

4. The method as claimed in claim 1, wherein the pixel-wise correction comprises interpolation of the pixel data.

5. The method as claimed in claim 1, wherein ascertainment and outputting and/or storage of a real magnification takes place after correction.

6. A digital optical imaging system having a zoom system, an image recording sensor and a logic unit for digital image processing, wherein the logic unit is configured to carry out a method as claimed in claim 1.

7. The imaging system as claimed in claim 6, wherein it is a digital microscope, which comprises an objective, wherein reduced zoom tables are stored in the objective and in the zoom system and are read by the logic unit in a calibration method and/or in a correction method.

8. The method as claimed in claim 1, further comprising:
   placing a reference object under the imaging system;
   selecting and storing a zoom setting of the zoom system in a reference table;
   recording a reference image by imaging the reference object on the image sensor;
   dividing the reference image into at least three color channel reference images $R_R$ $R_G$ $R_B$;
   fitting an ideal image into the reference image and ascertaining an image center in position and orientation;
   ascertaining a position error vector for n reference points of the reference object in each of the color channel reference images;
   storing the ascertained position error vectors in a reference table;
   repeating the previously mentioned steps for at least three different zoom settings.

9. The method as claimed in claim 8, wherein a base zoom table for i base zoom stages is compiled from the reference table by:
   ascertaining distortion correction coefficients $a_{m,n}$ from the position error vectors of the reference points which describe the deformation of the reference pattern, for each color channel reference image, wherein m=[R, G, B] and n=1 . . . 11;
   ascertaining image stability correction coefficients $I_X$, $I_Y$ which describe a deviation of the image stability of the reference pattern.

10. The method as claimed in claim 9, wherein a zoom table is compiled from the base zoom table by ascertaining the distortion correction coefficients $a_{m,n}$ according to the following rule:

$$a_{m,n}(i(\beta))=a_{m,n}(i^0=1)+a_{m,n}(i^0=2)*\beta+a_{m,n}(i^0=3)*\beta^2+a_{m,n}(i^0=4)*\beta^3.$$

11. The method as claimed in claim 9, wherein a zoom table is compiled from the base zoom table by ascertaining the image stability correction coefficients I according to the following rule:

$$I_m(i(\beta))=I_m(i^0=1)+I_m(i^0=2)*\beta+I_m(i^0=3)*\beta^2+I_m(i^0=4)*\beta^3.$$

12. The method as claimed in claim 8, wherein for each zoom setting a real zoom value β is ascertained and stored in the reference table and possibly in the zoom table.

* * * * *